INVENTOR
Warren E. Dion
By Edward H. Goodrich
His Attorney

May 2, 1961   W. E. DION   2,982,402
INSPECTION MECHANISM
Filed Nov. 27, 1956   4 Sheets-Sheet 3

INVENTOR
Warren E. Dion
BY Edward H. Goodrich
HIS ATTORNEY

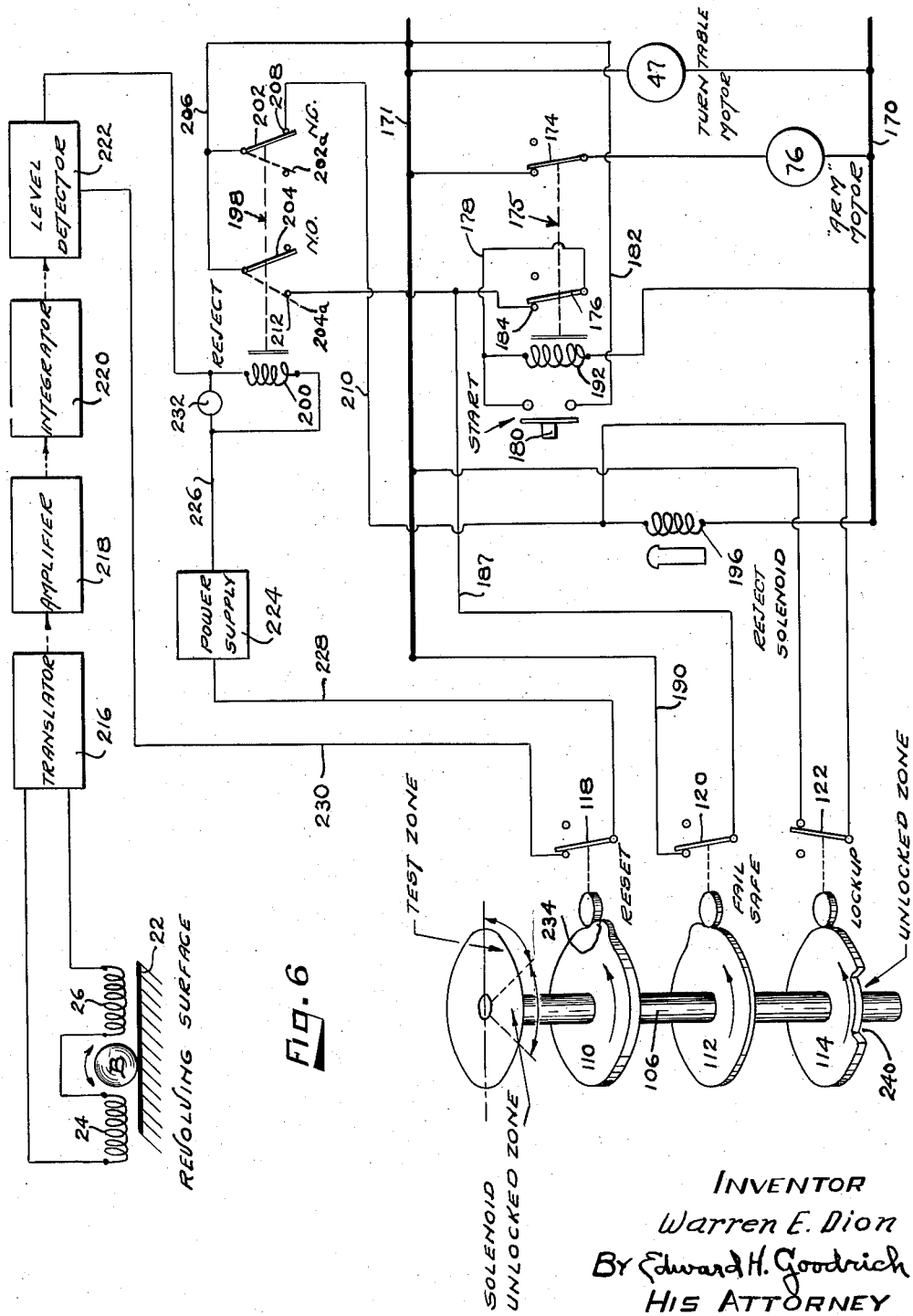

United States Patent Office 2,982,402
Patented May 2, 1961

2,982,402
INSPECTION MECHANISM

Warren E. Dion, Forestville, Conn., assignor to General Motors Corporation, Detroit, Mich., a corporation of Delaware Filed Nov. 27, 1956, Ser. No. 624,573

10 Claims. (Cl. 209—72)

This invention relates to inspection mechanisms and particularly to a device which rapidly sorts rolling elements in accordance with the defects in their material or structure.

Rolling elements such as the balls or rollers in antifriction bearings are repeatedly subjected to very heavy and ever-changing load stresses over very small areas during the usual operation of such a bearing. In spite of careful manufacturing controls, the steel which is usually employed for such rolling elements, occasionally contains bits of foreign material, inclusions and/or small structural errors. Even though the steel used in these bearings is usually subjected to rigid inspections before it is made into balls or rollers, many of these imperfections get into the rolling elements causing shortened bearing life and frequently resulting in sudden bearing failure. Additionally, the manufacturing procedures in the making of balls and in some types of rollers involves heading or other forming operations which occasionally produces cracks or internal structural weaknesses. Usually, these structural imperfections in balls and rollers which materially reduce bearing life, are so small that they are not normally deteced even by careful visual inspection. Furthermore, it has been found through analysis of rolling elements which have failed in operation that many of these imperfections lay below the smooth surface of the rolling element and, hence, were not detected by previously employed inspection methods. In addition to all of the foregoing, it is well recognized that aside from the frailties of human error, normal methods of visual inspection are slow and very expensive in view of the fact that many billion rolling elements for use in precision bearings are inspected in the course of a year.

It is, therefore, an object of this invention to provide an improved inspection mechanism which rapidly and automatically indicates imperfections in the material of rolling elements.

It is a further object of this invention to provide an improved inspection mechanism which sequentially receives and tests rolling elements and sorts them in accordance with cracks, inclusions or other errors within the rolling elements.

It is a further object of this invention to provide an improved inspection mechanism that rotates metal rolling elements within an alternating current field which is affected by inclusions and other errors within the rolling element structure and which sorts the rolling elements of unacceptable material from those of acceptable material.

It is a further object to rotate a rolling element in the confines of a predetermined high frequency alternating field and to employ the changes in this field as affected by errors in a rolling element structure to thereafter sort rolling elements of unsatisfactory structure from those of satisfactory structure.

To these ends and to improve generally upon devices and inspection methods of this character, this invention consists in the various matters hereinafter described and claimed. In its broader aspects, the invention is not necessarily limited to the specific structures selected for illustrative purposes in the accompanying drawings wherein Figure 1 is a fragmentary perspective view showing the general arrangement of my invention.

Figure 4 is a fragmentary view showing the work loading mechanism for sequentially feeding the rolling elements.

Figure 6 is a schematic wiring diagram.

Figure 1:
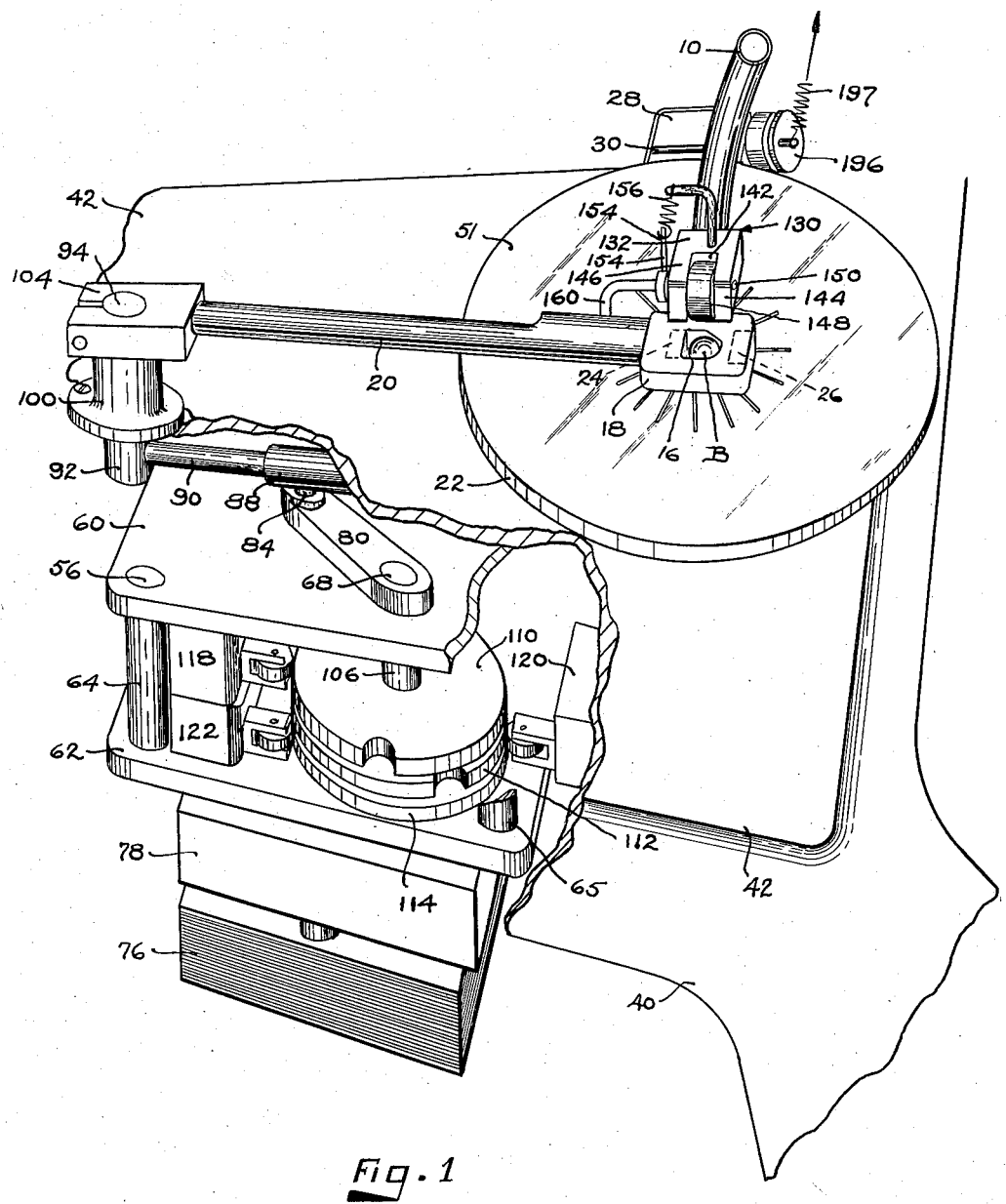
Figure 2:
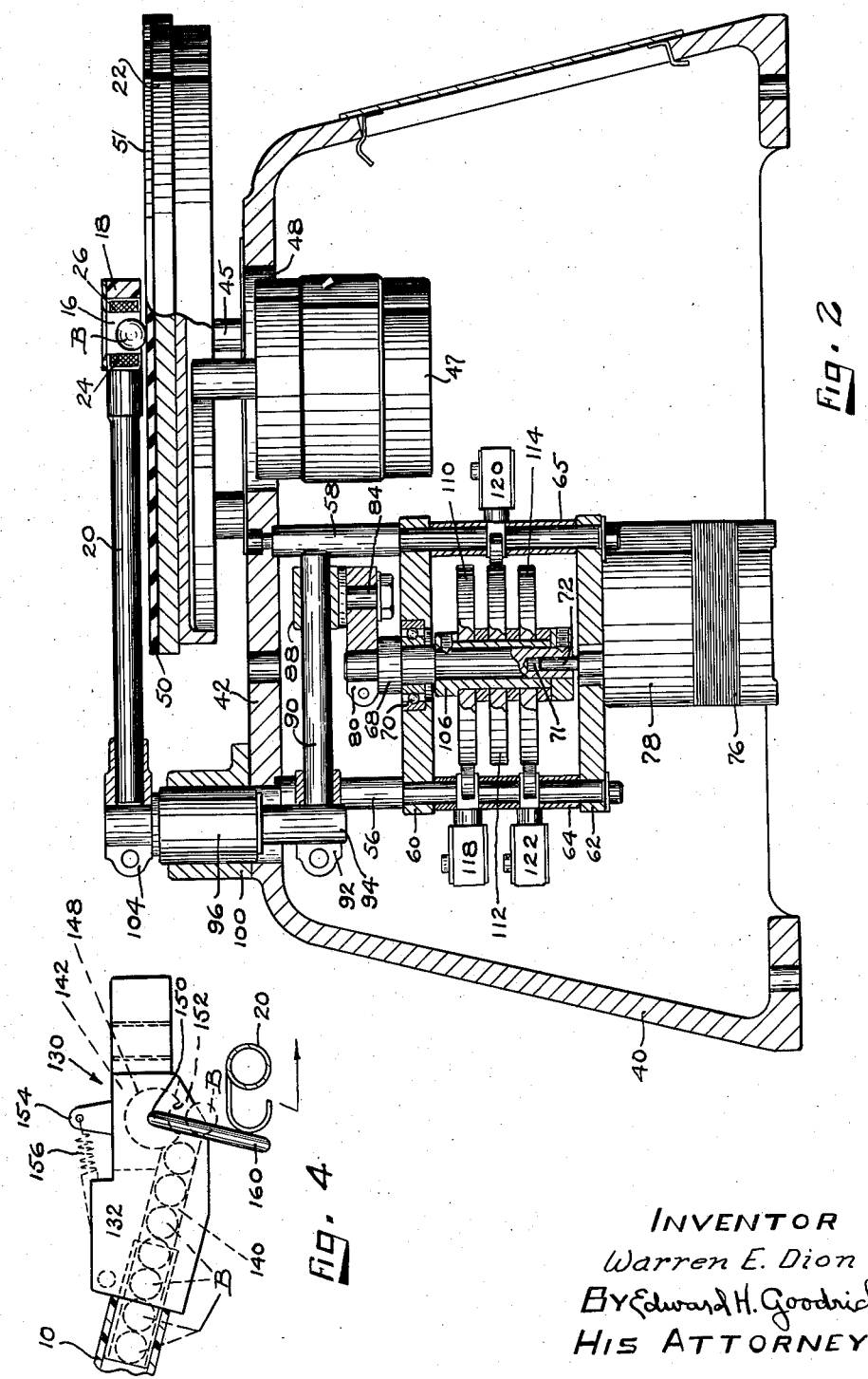
Figure 2 is a cut-away side elevation taken partly in section.

As illustrated, my invention comprises a method and apparatus for inspecting balls to be used in antifriction bearings and automatically segregates balls having cracks, inclusions, unacceptable grain structure, or other physical defects. This inspection method and apparatus is not limited to balls but applies equally well to the inspection of any rolling elements of uniform contour and wherein errors in the homogeneity of the material of these rolling elements may affect a predetermined alternating current field to change the inductive effect and/or the frequency of this field for controlling my indicating and sorting mechanism.

Generally considered, an inclined delivery tube 10 receives rolling elements such as rollers or balls B in abutting stacked relation to be individually and sequentially released by an escapement mechanism which drops the first ball of the stack into a pocket 16 in a head 18 mounted at the outer end of an oscillated arm 20 located just above a rotatably driven turntable 22. An alternating current circuit of predetermined voltage and frequency is introduced in two series connected coils 24 and 26 mounted in the head 18 at each end of the ball pocket 16. As the arm 20 oscillates across the rotating table, a rolling element as the ball B being tested is rotated about its axis by engagement with the table and is swung by this arm beyond the edge of the table to be received within a discharge hopper 28 containing a sorting vane 30. If the material of the ball being tested is homogeneous, of acceptable uniform structure, free of cracks or other defects, the field of the alternating current circuit about the test coils 24 and 26 is not appreciably affected and the vane 30 directs the tested ball into a chute 33 for receiving acceptable balls. However, if the material of the ball is non-homogeneous, contains cracks, inclusions or other objectionable defects or even an objectionable structure, the alternating current field about these coils is sufficiently affected to control mechanism which in turn shifts the vane 30 to its full line position causing the unacceptable balls to be delivered into a chute 32 for unacceptable balls. As illustrated, the axes of the two spaced coils 24 and 26 are angularly disposed to the axis of rotation of the rolling element B so that the revolving movement of a non-homogeneous portion of the rotating element B between these coils will cut the path of the alternating current field of these coils to affect a change in this field which controls the subsequent sorting operation.

Referring to the illustrated embodiment, a hollow base 40 has side walls supporting a generally flat bed 42 above which is supported the horizontal turntable 22 rotatably driven by a vertical shaft 45 journalled on the table and driven through a suitable gear reduction unit by a motor 47 received within an aperture 48 and supported within the base. A disc 50 secured to the table as by a suitable cement, has a flat upper face 51 arranged to support and rotate the ball B within the pocket 16. This disc 50 may be of any convenient material such as a phenolic condensation product or hard rubber and is preferably cut close to its axis by a series of short radiating grooves 53 for a purpose to be later described.

Figure 3:
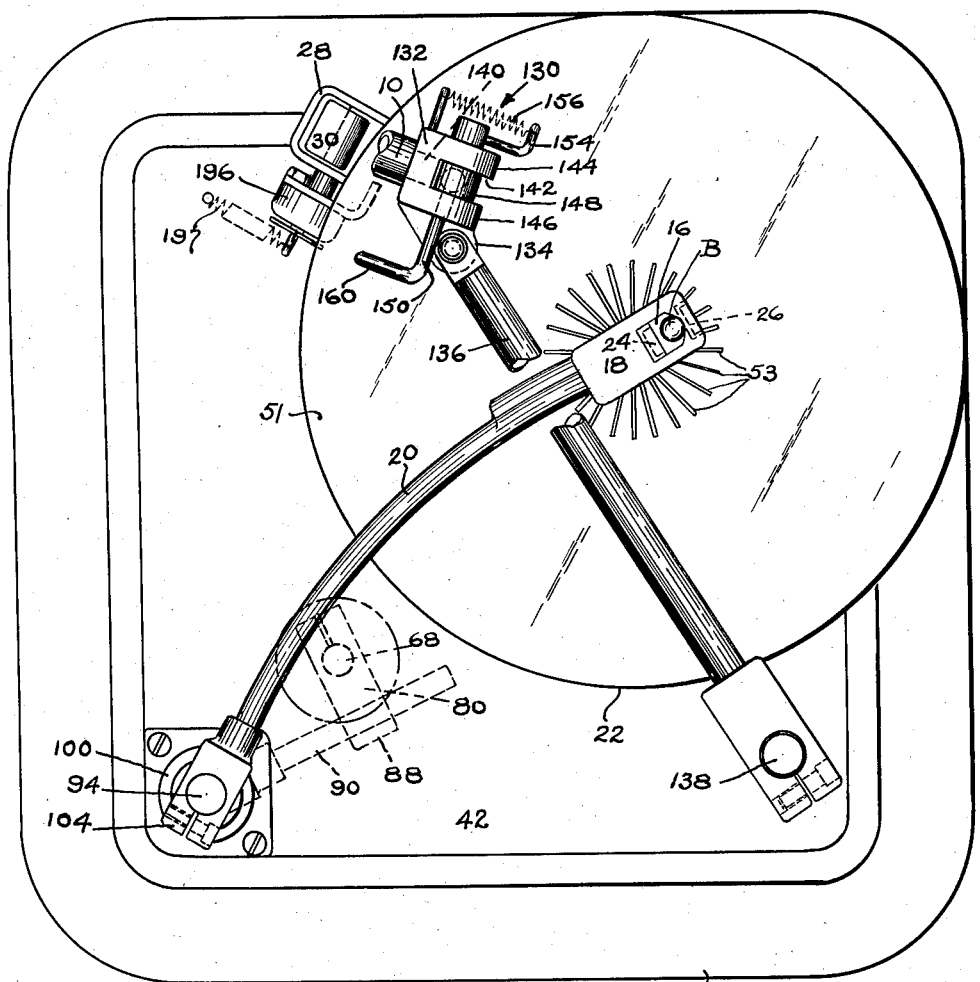
Figure 3 is a plan view of my invention.

A series of posts two of which are shown at 56 and 58, are mounted in the bed 42 in depending relation and support a horizontally disposed upper mounting plate 60 and a horizontally disposed lower mounting plate 62, these mounting plates being positioned in vertically spaced relation by sleeves 64 and 65 mounted over reduced portions of the posts. A vertical shaft 68 at its upper end extends through and is supported in a bearing 70 carried by the upper mounting plate 60. The lower end of the shaft 68 has a socket 71 in driven relation with the upper end of a vertical shaft 72 suitably journalled in the lower mounting plate 62. An arm driving motor 76 secured beneath the mounting plate 62 operates through a gear reduction unit 78 to drive the shaft 72 and thence the shaft 68. A crank arm 80 adjustably clamped to the upper end of the shaft 68 supports at its outer end an upwardly projecting crank pin 84. A head 88 having a horizontal bore which slidably receives a crank arm 90, is journalled on the upper end of this pin. This crank arm laterally projects from a head 92 adjustably clamped to the lower end of a vertical shaft 94 having an intermediate enlarged portion 96 journalled in and projecting out of each end of a boss 100 secured to the bed 42. A head 104 adjustably clamped to the upper end of the shaft 94, supports the arm 20 above the rotatably driven turntable 22, the outer end of this arm carrying the head 18. The testing or pickup coils 24 and 26 fit within recesses in the head 18 at each side of the ball B being tested. The crank arm 80 is adjusted on the shaft 68 and the heads 92 and 104 are so adjusted on the shaft 94 that the arm 20 oscillates back and forth to arcuately swing the head 18 from a position over the hopper 28 to a position just past the center of the table as best shown in Figure 3.

A sleeve member 106, secured to the vertical shaft 68 as by a set screw, has a shouldered upper end against which is secured a reset cam 110. A fail-safe cam 112 and a locking cam 114 are secured to a reduced portion of the sleeve 106 and held in spaced relation beneath the cam 110 by intervening collars. A locking collar at the lower end of the sleeve 106 secures the cams 110, 112 and 114 in preadjusted angular relation to each other and fixed to rotate in unison with the sleeve 106. These three cams engage spring pressed rollers to respectively operate a reset switch 118, a fail-safe switch 120 and a locking switch 122 as will be later described.

A work loading mechanism generally indicated at 130 is located over the rotatably driven table 22 near its outer edge and beneath the path of movement of the oscillated head 18 to sequentially drop individual balls into the pocket 16 for succeeding inspection and sorting operations. This work loading mechanism includes a generally yoke-shaped member 132 having a laterally projecting arm 134 pivotally and adjustably secured to a support arm 136 extending across the table above the arm 20 and clamped at its outer end in adjusted position upon a vertical post 138 supported by the bed 42. The inclined delivery tube 10, which receives a stack of balls B to be inspected and segregated in accordance with structural defects, is secured at its lower end to the member 132 and delivers these balls through a bore 140 into a slot between a pair of laterally spaced arms 144 and 146 on the member 132.

A generally cylindrical release member 148 mounted between the laterally projecting arms 144 and 146 at the end of and slightly above the bore 140, is secured to a transverse shaft 150 journalled in the arms 144 and 146. The release member 148 has an arcuate cut-out portion 152 (Fig. 4) and is intermittently rotated through a partial turn to receive the first ball in the stack and drop it into the pocket 16 when the head 18 is therebeneath. An upstanding arm 154 secured to the shaft 150 is urged counterclockwise by a spring 156 secured to a pin mounted in the yoke member 132 to normally locate the arcuate portion 152 in its downwardly indicated position wherein the lowermost roller of the stack locates against the cylindrical portion of the release member 148 to prevent feeding of the balls. A downwardly bent arm 160 of the transverse shaft 150 is located in a position to be engaged by a projecting portion of the swinging arm 20. When the oscillating arm 20 swings the head 18 beneath the work loading mechanism and into a position over the hopper 28, the arm 160 is engaged by the arm 20 causing a clockwise movement of the release member 148 to present the arcuate recess 152 in a position to receive the first ball B of the stack within the feeding mechanism. During the ensuing swing of the arm 20 to pass the head 18 under the release member 148, the coiled spring 156 turns the member 148 causing the cut-out portion 152 to feed the first ball from the stack and drop it into the pocket 16 therebeneath. While this feeding operation occurs, the cylindrical portion of the member 148 engages the next ball in the stack and prevents it from being released.

Referring now to the electronic control mechanism, current from a suitable source is delivered through power lines 170 and 171 to the motor 47 causing continuous rotation of the turntable 22. This speed of rotation is not critical but should be sufficient to cause the ball B under test to make at least several rotations during each swing of the head 18 across the turntable. The arm motor 76 is connected to the power line 170 and to the power line 171 through the normally closed switch arm 174 of a normally energized fail-safe relay 175 to maintain continuous oscillation of the head 18 above the turntable and to also continuously rotate the cams 110, 112 and 114 which respectively control the switches 118, 120 and 122. The fail-safe relay 175 also has a normally closed switch arm 176 connected through a line 178 to one contact of a normally open circuit starting switch 180, the other contact of this switch 180 being connected through a line 182 to the power line 171. A contact 184, engaged by the switch arm 176 when closed, connects through a line 187 to the fail-safe switch 120 which is normally in closed circuit with the power line 171 through a line 190. A control solenoid 192 in the fail-safe relay 175 is normally energized to shift the switch arms 174 and 176 into and to hold these switch arms in their indicated closed circuit positions. This solenoid 192 is connected at one end to the power line 170 and is normally held energized through the switch arm 176 in closed circuit position and through the normally closed fail-safe switch 120. In the event that circuit through this solenoid 192 has been broken permitting the arms 174 and 176 to shift to open circuit positions, a momentary closing of the starting switch 180 connects the solenoid 192 again across the power lines and shifts these switch arms 174 and 176 to closed circuit positions wherein the switch arm 176 provides an interlocking circuit.

Figure 5:
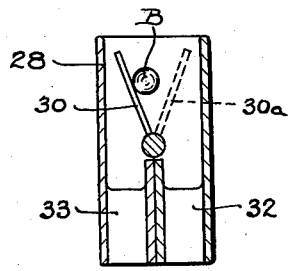
Figure 5 is a cross section through the sorting mechanism.

A reject solenoid 196 is operately connected to shift the sorting vane 30 in the hopper 28. In the present illustration, this sorting vane normally assumes its full line position of Fig. 5 under the influence of a spring 197 to divert unacceptable balls into the chute 32. The solenoid 196 is energized to shift the vane 30 to its dot-dash indicated position 30A so that the acceptable balls will be directed into the chute 33. The reject solenoid 196 is under control of a reject relay 198 having an operating solenoid 200 which may be energized to shift a switch arm 202 from a normally closed circuit position to an open circuit position 202a and which simultaneously shifts a switch arm 204 from its indicated normally open circuit position to a closed circuit position 204a. These switch arms 202 and 204 are connected through a line 206 to the power line 171. The switch arm 202 in closed circuit position makes a circuit through a contactor 208 and a line 210 to the solenoid 196. The switch arm 204, when shifted to closed circuit position, makes connection with a contact 212 in circuit with the line 187 and the contactor 184.

Alternating current from a suitable source is fed through a translator 216 which is in circuit with the series connected pickup coils 24 and 26 at each side of the ball pocket 16. These pickup coils are preferably connected in opposing field relation to increase their total inductive effect so they may be of small compact construction. It has been found that a metal ball or roller when rotated in a substantially fixed position in an alternating current field of controlled frequency and voltage does not materially affect the inductive or frequency effect in this field if the ball or roller is of uniform homogeneous material. However, if this ball or roller has cracks, inclusions, specks of dirt or other conditions which create a non-uniform structure, the movement of these defects materially affects changes in the alternating current field about and in the current flow through these pickup coils. Additionally, if the alternating current supplied to these pickup coils is of sufficiently high frequency, only defects in the rotating ball or roller near its surface effect changes in the inductive and/or frequency effect associated with these pickup coils. In experimental tests with this inspection apparatus, it appears that a relatively high frequency may be desirable in the coils 24 and 26 since it may be unnecessary to pick up imperfections and flaws in the ball or roller being tested at any great depth below its surface. My inspection apparatus has operated satisfactorily at frequency ranges as low as 10 kilocycles per second and as high as 2 megacycles per second. However, it is not intended that this invention be limited within this range since other frequencies beyond these limits could be effectively employed.

The translator 216 may comprise any suitable electronic arrangement such as an oscillator which provides a desired frequency of alternating current in the coils 24 and 26. These coils are only indicated diagrammatically and the size of these coils will be determined to a considerable extent by the voltage, frequency and current therein. The signals delivered from the coils 24 and 26 to the translator 216 may be suitably amplified in an amplifier 218 which controls a signal integrator 220 which in turn controls a level detector 222. The signal integrator 220 accumulatively collects the responses from the amplifier 218, and the level detector 222 is preadjusted to control the sensitivity response of the circuits in accordance with the maximum aggregative structural defects in the ball to be tested.

The signal integrator 220 may be of a suitable construction wherein signals received from the amplifier 218 are fed into the primary of a transformer while one side of the secondary of this transformer feeds through a rectifier and a resistor to the level detector, the other side of the transformer being fed directly to the level detector. A condenser, and if desired a resistor may be in parallel relation across the secondary of the transformer. With this arrangement, the condenser and the resistor across the secondary will accumulatively collect responses from the amplifier and transmit the signals to the level detector. With this arrangement of integrator, minor table surface errors, bits of dirt, momentary line voltage changes and non-repetitive signals do not affect the response of the level detector. However, a structural error in a rotating ball repetitively affects the field about the coils 24 and 26 and results in a sensitive response of the level detector. The level detector 222 may comprise a suitable voltage regulating device which is preferably adjustable and wherein signals only above a certain level are employed to operate a relay. A power supply 224 is connected at one side to a line 226 to the reject relay solenoid 200 and is connected at the other side through a line 228 to the normally closed reset switch 118 and thence back to the relay in the level detector through a line 230. Hence, only signals above a certain level received from the level detector will operate to energize the solenoid 200 of the reject relay 198 with a consequent energizing of the rejection solenoid 196. A lamp 232 connected in parallel with the reject solenoid 200 lights when this solenoid is energized to indicate that the rolling element being tested is unacceptable.

Referring now to the operating cycle, while current is supplied to the power lines 170 and 171, the turntable 22 is continuously rotated by the motor 47 and the arm motor 76 is normally operated to continuously oscillate the head 18 above the turntable. In the event that the arm motor 76 is not operating, the starting switch 180 is closed to shift the fail-safe relay 175 to closed position, this relay being thereafter held closed through a locking circuit which includes the now closed switch arm 176. At the start of the cycle, as the head 18 is swung clockwise from a discharge position over the hopper 28, the spring urged release member 148 under control of the moving arm 20 turns and releases only the first ball B from the supply stack into the pocket 16 while the head 18 swings therebeneath. The ball B within the pocket 16 is rotated by the smooth turntable face while being moved towards the center of the turntable. During this clockwise movement of the arm 20, the high portion of the locking cam 114 holds the locking cam switch 122 in a closed circuit position resulting in the energizing of the reject solenoid 196 and in the shifting of the sorting vane 30 to the position 30A.

In the event that the rotating ball B being tested within the pocket 16 has a non-homogeneous and/or unacceptable structure, the induction within the pickup coils 24 and 26 will be materially affected causing an unbalance of the preadjusted level detector resulting in the energizing of the reject relay 198 and causing the reject relay switch arms to shift to the dot-indicated positions 202A and 204A. However, during this portion of the cycle, the reject relay 198 will have no effect since the reject solenoid 196 is already locked in circuit by the now closed switch 122 and the fail-safe relay 175 is held in energized position by an interlocking circuit through its switch arm 176.

During the intermediate portion of the cycle, while the head 18 is swung over a central portion of the turntable 22, the ball B under test is agitated by the short radiating grooves 53 to test the circuit and assure that my inspection mechanism is in correctly adjusted satisfactory operating condition. This ball agitation intentionally upsets the inductive and frequency effect in the pickup coils 24 and 26 causing the reject relay 198 to be energized if it is not already energized. While the ball B within the pocket 16 is being thus agitated, a high point 226 on the fail-safe cam 112 momentarily opens and thereafter closes the switch 120. The opening of this switch 120 does not normally break circuit to the fail-safe relay solenoid 192 at this time since this circuit is maintained through the now closed switch arm 204 which is held at position 204a. In the event that my apparatus is improperly adjusted or that there is insufficient response to the pickup coils 24 and 26, the level detector will not shift the reject relay 198 to an operative position and the opening of the fail-safe switch 120 will break circuit to the solenoid 192 disconnecting the arm motor 76 and stopping oscillation of the arm 20 and head 18 as well as stopping rotation of the cams 110, 112 and 114 thereby preventing inaccurate sorting of the balls.

The head 18 thereafter swings counterclockwise away from the central portion of the turntable 22 and immediately after the ball B within the pocket 16 engages the smooth upper face of the turntable, a high point 234 on the reset cam 110 momentarily opens the reset switch 118 cutting off the power supply to the reject relay solenoid 200 and permitting the switch arms 202 and 204 to swing back to their full line indicated position. The switch 118 thereafter closes transferring control of the reject relay 198 back to the level detector 222 during the ensuing testing period which occurs during this counterclockwise swing of the head 18. During this testing portion of the cycle if as is usually the case, the ball being tested has no internal flaws, cracks or other material defects, the inductive and frequency effect associated with the pickup coils 24 and 26 is not sufficiently changed to cause the level detector 222 to result in an energizing of the reject relay 198. However, in the event that the ball B being tested has structural defects, the level detector circuit is unbalanced as a result of the change in inductive and frequency effect about the pickup coils caused by the defective ball and the reject relay is energized and the lamp 232 lights to indicate a defective ball in the pocket 16. A suitable holding circuit maintains the unbalance of the level detector throughout this testing period until the switch 118 is again opened. A recessed portion 240 in the locking cam 114 causes the switch 122 to shift to open circuit position just before the head 18 reaches the hopper 28 and serves to hold this switch open while the pocket 16 remains above and drops the tested ball into the hopper. When the switch 122 opens, control of the reject solenoid 196 is shifted to the reject relay 198. If the reject relay remains deenergized due to an acceptable ball within the pocket 16, the closed switch arm 202 places the reject solenoid in circuit which shifts the vane 30 to the position 30a causing the ball dropped into the hopper 28 to enter the chute 33 for acceptable balls. If an unacceptable ball has caused the reject relay 198 to become energized, circuit to the relay 196 is broken and the spring 197 locates the vane 30 in its full line position so that the tested ball dropped into the hopper will be directed into the chute 32 for unacceptable balls.

It is to be understood that my invention is not limited to the specific circuit arrangements and controls described and that other electronic circuits and/or controls may be employed within the scope of this invention to provide the automatic cycle of operations of this invention.

I claim:

1. An inspection mechanism for metal rolling elements comprising a rotatably driven support for a rolling element, a coil mounted for movement above and across said support, mechanism locating the rolling element in a predetermined spaced relation to the coil while being rotated by said support, mechanism providing an alternating current of controlled frequency and voltage within the coil to produce an alternating current field about the rolling element, mechanism for receiving and sorting rolling elements, and electrical control means for said sorting mechanism which responds to changes in inductance within the coil resulting from changes in said field caused by the movement of defective structural portions of the rolling element within said field.

2. An inspection mechanism for metal rolling elements comprising a rotating turntable having a substantially flat face for supporting and rotating a rolling element, an arm above the table, means to oscillate said arm across the table, the arm having an open ended pocket for receiving a rolling element supported on the turntable face while the rolling element is rotatably driven by the turntable, a coil within the arm adjacent the rolling element, means producing an alternating current of controlled voltage and frequency within the coil to provide an alternating current field about the rolling element, an indicating mechanism responsive to changes in frequency within the coil under control of changes in strength of the alternating current field due to movement of structural defects of the rolling element within said field.

3. An inspection mechanism for metal rolling elements comprising a rotating turntable, an oscillating arm above the turntable means to swing the arm back and forth across the table, said arm having an open ended pocket for receiving a rolling element on said table, said pocket guiding the rolling element across the turntable from a rolling element receiving position to a discharge position, a sorting mechanism receiving the inspected rolling element at the discharge position, a coil carried by the arm at one end of the pocket, means producing an alternating current circuit in said coil and providing an alternating current field in said pocket, indicating mechanism including a reject relay responsive to a change in inductance in the coil as influenced by the movement of structural defects in a rolling element in said field, and control means for the sorting mechanism responsive to the reject relay.

4. In an inspection mechanism for metal rolling elements, a rotatably driven turntable having a flat rolling element driving face, an arm mounted for oscillation above the turntable and having an open ended pocket for receiving a rolling element in rotatably driven turntable engagement, means to oscillate said arm between a work receiving position at one side of the table and a work discharging position at the other side of the table, a sorting mechanism adjacent the turntable periphery for receiving inspected rolling elements from said pocket, a work loading mechanism in the path of movement of said pocket for sequentially delivering individual rolling elements to said pocket, a coil carried by the arm adjacent to the rolling element in the pocket, means producing an alternating current of controlled voltage and frequency in said coil to provide an alternating current field about the rolling element, and electrically controlled means for the sorting mechanism responsive to changes in inductance in said coil as directly influenced by the movement of structural rolling element defects in said field.

5. An inspection mechanism for metal rolling elements comprising a rotating turntable having a flat rolling element engaging face, an oscillating arm above the turntable and having a pocket for receiving a rolling element means to oscillate said arm across the turntable between a work loading position and a work discharging position, a work loading mechanism actuated by said arm to deliver a single rolling element into the pocket at the start of each cycle at said work loading position, the pocket thereafter guiding the rotating rolling element across the turntable to a discharge position, a sorting mechanism for receiving rolling elements at the discharge position, a coil adjacent the end of the pocket, means providing an alternating current of predetermined strength and frequency in said coil and providing an alternating current field in said pocket, inspection mechanism including a reject relay responsive to a predetermined change in inductance in said coil as directly influenced by the movement of structural defects in a rolling element rotating in said field, the operation of the sorting mechanism being responsive to the reject relay, and a switch operated in timed relation to the arm movement momentarily before each rolling element inspection, said switch causing termination of the inspection cycle when the reject relay is unresponsive to an inductance change in said coil.

6. An inspection mechanism for metal rolling elements comprising a rotatably driven turntable having a flat rolling element driving face, an arm mounted for oscillation above the turntable and having an open-ended pocket for receiving a rolling element in rotatably driven turntable engagement mechanism to oscillate the arm, a work loading mechanism above the path of movement of said arm, a sorting mechanism adjacent the periphery of the turntable at one end of the path of movement of said pocket, a coil carried by the arm adjacent an end of the pocket, means including a circuit providing an alternating current of predetermined voltage and frequency in said coil to provide an alternating current field of predetermined strength about the rolling element in the pocket, means operated by said arm to sequentially receive individual rolling elements from the work loading mechanism prior to each testing cycle, and electrical control means actuated at the end of a testing cycle for operating the sorting mechanism in accordance with inductive changes in said circuit under the direct influence of the aggregate structural defects in the rolling element while it is being moved through said field.

7. In an inspection mechanism for rolling elements, a rotatably driven turntable having a flat rolling element engaging face, an arm oscillated above the turntable and provided with an open ended pocket for receiving and guiding a rolling element in turntable engagement through a test zone and an inspection zone to a discharge position, a coil carried by said arm at one end of the pocket, means including a circuit providing an alternating current of controlled strength within the coil to produce an alternating current field in said pocket, a level detector responsive to changes in said circuit, inspection mechanism responsive to signals above a predetermined level from said detector, means to vibrate the rolling element in the testing zone for changing the inductance in said coil to test the level detector and inspection mechanism, and electrical mechanism causing the level detector and inspection mechanism to thereafter respond to inductive changes in said coil affected by structural defects in the rotating rolling element within said field to indicate an unacceptable rolling element.

8. In an inspection mechanism for rolling elements, a turntable having a flat rolling element engaging face, means to rotate the turntable, an arm oscillated above the turntable and having an open ended pocket for receiving a rolling element and guiding it in table engagement through a test zone and an inspection zone to a discharge position, a coil secured to the arm adjacent one end of said pocket, means providing an alternating current circuit of controlled strength within the coil to produce a predetermined alternating current field within said pocket, said field and the inductance within said coil being affected by uneven movement of a rolling element within the pocket and by movement of a structural defect in the rolling element within said pocket, a level detector responsive to changes in said circuit, inspection mechanism responsive to signals above a predetermined level from said detector, means to vibrate the rolling element in the test zone for changing the inductive relation in said coil to test the level detector and inspection mechanism before inspection of the rolling element, and electrical mechanism causing cessation of the arm oscillation if the level detector and inspection mechanism fail to operate during testing.

9. An inspection mechanism for metal rolling elements comprising a rotatably driven turntable having a flat rolling element driving face, an arm mounted for oscillation above and across the turntable between a work loading and a work discharging position, said arm having an open ended work receiving pocket, a hopper for receiving a discharged rolling element at the discharging position beyond the periphery of the turntable, a sorting vane in said hopper, a work loading mechanism operated by the movement of said arm to sequentially deliver individual rolling elements into said pocket and upon said table at the start of each testing cycle, a coil in the arm adjacent the rolling element in the pocket and connected in an alternating current circuit of predetermined strength and frequency to provide an alternating current field about the work piece during inspection, a solenoid operatively connected to the sorting vane, an indicating mechanism including an electrical control means for said solenoid responsive to inductance changes in the electrical circuit under control of structural defects of the rolling element moving within said field, and means on the turntable producing a vibration of the rolling element to cause a change in inductance of said circuit and test said circuit and electrical control means proior to rolling element inspection.

10. In an inspection mechanism for metal rolling elements, a turntable having a flat rolling element engaging face, means to rotate the turntable, an arm above the turntable, means to oscillate the arm across the table, said arm having an open ended pocket for receiving a rolling element on the table and guiding it in table engagement through a testing zone and an inspection zone to a discharge position beyond the table, a coil in said arm adjacent one end of the pocket, means providing within the coil an alternating current of controlled strength to produce an alternating current field within said pocket, said field and the inductance in said coil being affected by uneven movements of a rotating rolling element in the pocket and by movements of a structurally defective rolling element within said pocket, a level detector responsive to changes in said circuit, inspection mechanism responsive to signals above a predetermined level from said detector, means to agitate the rolling element in the pocket in the testing zone for changing the inductive relation in the coil to test the level detector and inspection mechanism, electrical means thereafter transferring the response of the level detector and inspection mechanism under control of the rolling element in the inspection zone as influenced by any structural defects of the rotating rolling element in said field, a sorting mechanism at the rolling element discharge position for receiving and sorting the rolling element under control of the inspection mechanism, and means to terminate the testing cycle and prevent further sorting if the level detector and inspection mechanism fail to operate during the test period.

References Cited in the file of this patent

UNITED STATES PATENTS

| Re. 21,927 | Brace et al. | Oct. 21, 1941 |
| 2,051,695 | Glacy | Aug. 18, 1936 |
| 2,441,380 | Zuschlag | May 11, 1948 |
| 2,701,055 | Strom | July 9, 1953 |
| 2,744,233 | Paiviner | May 1, 1956 |
| 2,758,276 | Foerster | Aug. 7, 1956 |
| 2,778,497 | Bickley | Jan. 27, 1957 |

OTHER REFERENCES

Engler, A.P.C. Application of Engler Ser. No. 369,334 published May 18, 1943.